US008208174B2

(12) United States Patent
Kieser et al.

(10) Patent No.: US 8,208,174 B2
(45) Date of Patent: Jun. 26, 2012

(54) REDUCTION OF PITCH ERRORS BETWEEN POINTS OF A PRINT IMAGE

(75) Inventors: Axel Kieser, Berlin (DE); Olaf Turner, Berlin (DE)

(73) Assignee: Francotyp-Postalia GmbH, Birkenwerder (DE)

( * ) Notice: Subject to any disclaimer, the term of this patent is extended or adjusted under 35 U.S.C. 154(b) by 754 days.

(21) Appl. No.: 12/263,521

(22) Filed: Nov. 3, 2008

(65) Prior Publication Data

US 2009/0116047 A1 May 7, 2009

(30) Foreign Application Priority Data

Nov. 3, 2007 (DE) ........................ 10 2007 052 902

(51) Int. Cl.
*H04N 1/40* (2006.01)

(52) U.S. Cl. .......................... 358/2.1; 358/406; 358/468

(58) Field of Classification Search .................. 358/1.9, 358/2.1, 400, 500, 406, 504, 468
See application file for complete search history.

(56) References Cited

U.S. PATENT DOCUMENTS 5,730,049 A 3/1998 Broschart
6,428,671 B1 * 8/2002 Sogo et al. .................... 204/623
2002/0037191 A1 3/2002 Lesniak et al.
2005/0156979 A1 7/2005 Chang
2007/0236528 A1 10/2007 Oike

FOREIGN PATENT DOCUMENTS

JP 63301059 A * 12/1988
JP 2005029278 A * 2/2005

* cited by examiner

*Primary Examiner* — Thomas D Lee
*Assistant Examiner* — Stephen M Brinich
(74) *Attorney, Agent, or Firm* — Schiff Hardin LLP

(57) ABSTRACT

In a method and printing device, a deviation from a predetermined desired pitch that occurs between at least two points of at least one print image in a print direction is reduced. In a printing step, the at least one print image is generated on a substrate with at least one print head of the printing device with a relative movement between the at least print head and the substrate. In a determination step preceding the printing step, an initial deviation from a desired pitch between the two points is determined first and correction information to reduce the deviation is determined from the determined initial deviation. In the printing step, control signals for the at least one print head are generated depending on the correction information to generate the at least one print image. A variable delay of at least one of the control signals is predetermined by the correction information.

28 Claims, 7 Drawing Sheets

REDUCTION OF PITCH ERRORS BETWEEN POINTS OF A PRINT IMAGE

BACKGROUND OF THE INVENTION

1. Field of the Invention

The present invention concerns a method to reduce a deviation from a predetermined desired pitch (spacing) that occurs in a print direction between two points, of the type wherein the at least one print image is generated in a printing step with at least one print head of a printing device on a substrate given a relative movement between the print heads and the substrate; wherein an initial deviation from a desired pitch between the two points is determined in a determination step preceding the print step; and correction information to reduce the deviation is determined from the determined initial deviation; and control signals for the at least one print head are generated dependent on the correction information in the printing step to generate the at least one print image. Moreover, the application concerns a corresponding printing device.

2. Description of the Prior Art

In franking machines, as well as in other printing devices in which a substrate is printed in a single movement, the problem frequently exists that the print image to be generated has a dimension transversal to the printing direction that is larger than the print width provided by the employed print head type. Therefore, it is necessary to use multiple print heads in order to achieve the required print width. Since the housing of the employed print heads is normally wider than the actual area used for printing, it is typically not possible to arrange the printing regions of the print heads (in the printing direction) at the same level since in this case flush connection of the partial images (transversal to the printing direction) is not possible; consequently, no gapless print image can be generated. Therefore, it is necessary to arrange the employed print heads offset from one another in the printing direction and transversal to the printing direction in order to achieve a flush connection (possibly even a slight overlap) of the partial images.

This design has the result that pixels that lie next to one another on the print image but are generated by different print heads must in part be printed with a distinct time interval. For example, if a first pixel is printed at the edge of the first partial image by the first thermotransfer print head at a first point in time, the second pixel lying directly adjacent to the first pixel at the edge of the second partial image is only printed by the second print head when the substrate (for example a letter that is transported by a corresponding transport device) has overcome the distance in the printing direction between the two regions of the two print heads that are used for printing.

The relative position between the print heads and the substrate, and therefore reaching the position or, respectively, the point in time at which the second pixel is to be printed, is typically registered via a corresponding measurement device. This is typically an encoder connected with the drive of the transport device that provides at its output a definite number of measurement signals in the form of encoder pulses per unit distance of the relative movement (between the substrate and the print heads) that is traveled. Given such transport devices, rotating elements (in particular rollers and similar elements) are typically used in order to transport the substrate to be printed.

Due to the illustrated time offset of the printing of adjacent points by different print heads, the imprints of such printing devices in the print direction can exhibit an offset between the two adjoining print images (partial images) as a deviation form a predetermined desired pitch between points of the (total) print image. It is hereby understood that in this case the desired pitch (in the printing direction) between the immediately adjacent points of the two (partial) print images is equal to zero; thus no offset of the two (partial) print images is desired at all. This offset typically has a static offset portion and a periodic offset portion. Such an offset between the two adjoining (partial) print images in the field of generation of franking images is not least due to the increasing requirements for machine readability of such print images.

The static offset portion is typically due to the diameter error of the drive elements, or is based on position errors due to tolerances in the installation of the print heads. For example a deviation of the diameter of the transport roller for the substrate from its desired value is due to the fact that reaching the print position or, respectively, the printing point in time too early (smaller diameter) or too late (larger diameter) is registered in the evaluation of the measurement signals (for example counting the encoder pulses) of the shaft encoder (encoder) connected with the transport roller.

This problem is typically solved in such known printing devices via readjustment of the print heads. Typically, a test pattern (for example a nonius [vernier] pattern) is printed out by the two print heads and the separation of the two regions used for printing (thus the separation of the two nozzle rows given the use if inkjet print heads) in the printing direction is determined using the position of the minimal offset and is passed as correction information to the controller of the print heads. However, only static offset proportions that are an integer multiple of the print resolution can be entirely corrected with this. For example, if a print resolution of 300 dpi is provided, the maximum remaining residual error is still ±1/600 in or, respectively, approximately ±42 μm. A normal remaining residual error that can significantly impair the quality of the imprint cannot be corrected by this.

Furthermore, the occurring periodic offset portion is due to variable interferences in the printing with different print heads. Since adjacent points are printed by different print heads at different points in time, under the circumstances an interference present upon printing the first point with the first print head has already-subsided again when the immediately adjacent second pixel is printed with the second print head.

There are multiple causes for this periodic offset proportion, such as an eccentric connection of the encoder, an eccentricity of the driving rollers (same period duration but deviating phase position), ovality errors of the driving rollers (deviating period duration and deviating phase position) as well as shocks that can occur due to changes of the engagement ratios of the drive elements.

The causes just described for the static and period offset portions do not, however, occur only given the use of multiple print heads arranged with offset. Rather, they also have an effect in printing devices with a single print head. Here they affect the separation of following points in the print direction and draw attention as constant (static portion) or periodically variable (periodic portion) expansion and/or compression of the print image in the print direction.

A method and a device for calibration of driver signals of a print head is known from the disclosure document DE 10 2004 053 146 A1. The calibration is implemented after exchanging a cartridge. Four parameters of the driver signal are calibrated: the duration of the main drive pulse; the duration of the preheating pulse; the time interval between pre- and main drive pulse; and the driver voltage. For each of these parameters, multiple test prints are printed depending on different respective values of a parameter. The respective parameter value that leads to the best print result is subsequently selected. Neither a dynamic observation of the printing device nor a detection of a periodic offset proportion occur.

SUMMARY OF THE INVENTION

An object of the invention is to provide a method and a printing device of the aforementioned type that do not exhibit the disadvantages cited above, or exhibit them at least to a lesser degree. In particular, at least a reduction of a deviation from a predetermined desired pitch occurring between at least two points of at least one print image should be enabled.

The present invention is based on the technical insight that a reduction of a deviation from a predetermined desired pitch (in particular a reduction of an offset between two adjacent print images) that occurs between at least two points of at least one print image is possible in a simple manner when the deviation between the points is initially detected and then at least reduced via a correspondingly adapted—in particular temporally variable—delay of at least one of the control signals. By a temporally variable delay of the at least one control signal (in particular all control signals), it is possible not only to even further reduce but even to entirely compensate (if necessary) a static deviation proportion relative to the previously known solutions. It is likewise possible to vary the temporal delay of the control signals via a periodic delay portion so that temporally variable (in particular periodic) components in the deviation from the predetermined desired pitch can also be counteracted. It is hereby advantageously possible to even arrive at a complete compensation of the deviation from the predetermined desired pitch if necessary.

Given the compensation of offset errors between adjacent print images generated by different print heads, the offset between the adjacent print images can accordingly be initially detected and then be at least reduced via a correspondingly adapted (in particular temporally variable) delay of at least one of the second control signals for the second print head. Via a temporally variable delay of the at least one second control signal (in particular of all second control signals) it is possible to not only even further reduce but even to completely compensate (if necessary) a static offset proportion relative to the previously known solutions. It is likewise possible to vary the temporal delay of the second control signals over a periodic delay portion so that even temporally variable (in particular periodic) components can be counteracted in the offset between the print images of the two print heads. It is advantageously possible to even arrive (if necessary) at a complete compensation of the offset between the two print images.

It is hereby understood that it may be sufficient to correspondingly temporally delay only that control signal which triggers the generation of the appertaining pixel by the appertaining print head. However, multiple appertaining control signals (in particular all appertaining control signals) are preferably correspondingly delayed in order to implement a delay algorithm to be realized with correspondingly simple design.

According to one aspect, the present invention accordingly concerns a method to reduce a deviation from a predetermined desired pitch that occurs between at least two points of at least one print image in a print direction, in which method, in a first printing step, the at least one print image is generated on a substrate with at least one print head of a printing device under a relative movement between the at least print head and the substrate. In a determination step preceding the printing step, an initial deviation from a desired pitch between the two points is determined first and correction information to reduce the deviation is determined from the determined initial deviation. In the printing step, control signals for the at least one print head are generated depending on the correction information to generate the at least one print image, wherein an (in particular variable) delay of at least one of the control signals is predetermined by the correction information.

In variants of the method according to the invention with two print heads, to reduce an offset occurring between two print images in a printing direction the two print images are generated on a substrate in a printing step with two print heads arranged offset from one another in the printing direction under a relative movement between the print heads and the substrate. In a determination step preceding the printing step, an initial offset between the two print images is thereby determined and correction information to reduce the offset is determined from the determined initial offset. In the printing step to generate the two print images, first control signals for the first print head and second control signals for the second print head are generated depending on the correction information, wherein an (in particular variable) delay of at least one of the second control signals is predetermined by the correction information.

The appertaining control signals (in particular the first and second control signals) can in principle be generated in any suitable manner. The control signals (in particular the first control signals and second control signals) are advantageously generated from measurement signals that are representative of the relative movement between the two print heads and the substrate. The measurement signals are preferably pulses of an encoder that is connected with a drive (actuator) generating the relative movement between the two print heads and the substrate, since a particularly simple configuration can be achieved in this manner.

In preferred variants of the method according to the invention in which the initial deviation has at least one periodic deviation portion, it is provided that a variable time delay of the at least one control signal is provided by the correction information, which delay has a periodic delay portion corresponding to the at least one periodic deviation portion, wherein the periodic delay portion is selected such that the delay of the control signals counteracts the deviation of both points from their desired pitch. If the initial deviation additionally or alternatively has at least one static deviation portion, additionally or alternatively a variable time delay of the at least one control signal is provided by the correction information, which delay has a static delay portion corresponding to the at least one static deviation portion, wherein the static delay portion is selected such that the time delay of the control signals counteracts the deviation of both points from their desired pitch.

Given printing devices with two (or more) print heads in which the initial offset possesses at least one periodic first offset portion, it is provided that a variable time delay of the at least one second control signal is provided by the correction information, which delay has a periodic first delay portion corresponding to the at least one periodic first deviation portion, wherein the periodic first delay portion is selected such that the delay of the second control signals counteracts the offset of both print images. In other words, with the present invention it is possible to compensate a known or, respectively, foreseeable disruption (for example a periodic disruption inherent to the operation of the printing device, as described above) that would lead in conventional printing devices to a periodic offset between the two print images, in that the second control signals are correspondingly delayed so that the corresponding pixel printed via the second print head again lies at the exact desired position next to the first pixel printed previously by the first print head.

It is understood that, for the case that a negative delay results in calculation from the periodic first offset portion, it can be provided that all second control signals can additionally be delayed by a corresponding (constant) delay amount (corresponding to at least the maximum absolute value of the determined negative delay) in order to always be able to work with positive delay values. This is particularly advantageous given the use of encoders which deliver as a measurement signal an encoder pulse that can naturally be subjected only to a positive delay. If this is the case, the adjustment must then be made that the printing of the second print image must already begin one or more encoder pulses earlier.

The temporally variable delay can in principle be generated in any suitable manner. In advantageous variants of the method according to the invention it is provided that the first control signals and the second control signals are generated from measurement signals that are representative of the relative movement between the two print heads and the substrate. In the determination step, the periods and the phase position of the periodic first offset portion relative to the measurement signals are then determined, and the amplitude of the first delay portion is subsequently selected as a function of the phase position of the first offset portion. It is thus possible in a simple manner to compensate for such a periodic offset portion.

In additional advantageous variants of the method according to the invention in which the initial offset has at least one static, second offset portion due to the offset of the two print heads, a variable time delay of the second control signals is provided by the correction information, which delay has a second delay portion counteracting the static second offset portion. The second delay portion can hereby possess an arbitrary time curve. In variants that are particularly simple to realize, it runs linearly.

The first control signals and the second control signals are advantageously generated from measurement signals that are representative of the relative movement between the two print heads and the substrate, and in the determination step a print time offset corresponding to the static, second offset portion is determined as a difference of a desired point in time to avoid the static second offset portion and a predeterminable number N of periods of the measurement signals. For the case that the print time offset is not an integer multiple of the period duration of the measurement signals, the print time offset is sub-divided into M (in particular equal) delay values. At least one part of the measurement signals is subsequently, respectively delayed by one of the delay values with regard to the preceding measurement signal. A temporally variable delay of the second control signals (for example a delay constantly increasing relative to a start point in time) can hereby be achieved in a simple manner.

In principle, an arbitrary distribution of the total print time offset to be achieved to the individual second control signals is hereby possible. In other words, if necessary it can also be provided that only one or individuals of the second control signals are correspondingly delayed. However, a uniform distribution of the print time offset to the individual control signals advantageously occurs since such a configuration is particularly simple to realize.

The number N of periods of the measurement signals is advantageously to be selected so that an optimally small print time offset results, wherein both a positive and a negative print time offset is possible. If a negative print time offset results, this can likewise be distributed to the delay of the individual second control signals, wherein then a (constant) positive delay (by one full period) is naturally, advantageously, additionally impressed on all delayed second control signals in order to always operate with positive delay values. However, it is advantageous for the predeterminable number N of periods of the measurement signals to be selected so that a positive print time offset results, such that in a simple manner it is ensured that a positive delay is always worked with.

As already mentioned, an arbitrary division of the print time offset to the delay of the individual second control signals can be provided. The print time offset is advantageously sub-divided into N identical delay values, and each subsequent measurement signal is respectively delayed by one of the delay values relative to the preceding measurement signal.

In principle, the initial offset can be determined in any suitable manner in the determination step. In preferred variants of the invention, it is provided that the initial offset is determined in the determination step from at least one test pattern generated by the two print heads. Additionally or alternatively, the initial offset can be determined from at least one print device behavior determined in advance for the print device. The print device behavior can be a behavior or, respectively, properties determined using measurements of the print device and/or using corresponding simulation calculations, which behavior or, respectively, properties have an influence on the initial offset. This behavior does not necessarily have to have been determined at the print device itself. Rather, if necessary it is also possible to determine this behavior using the measurements and/or simulations of a sample print device.

The correction information which represents the time delay of the second control signals can essentially be defined in any manner. Corresponding tables or data sets with corresponding discrete values for the time delay are advantageously provided since a particularly simple realization with low processing effort is hereby possible. Intermediate values can then be determined as necessary via interpolation or the like. It is likewise possible that the correction information is provided by a continuous function.

The present invention furthermore concerns a print device (in particular for a franking machine) with a control device, at least one print head and a drive device to generate a relative movement between the at least one print head and a substrate to be printed in a print direction. The control device is designed to control the at least one print head and the drive device such that at least one print image is generated on the substrate. To print the at least one print image, the control device generates control signals for the at least one print head. To reduce a deviation from a desired pitch that occurs between at least two points of the at least one print image in the print direction, the control device thereby uses stored correction information determined in advance, wherein an (in particular variable) delay of at least one of the control signals is provided by the correction information. The variants and advantages described above can be realized to the same extent with this printing device, such that reference is made in this regard to the statements above. In particular, the method according to the invention that is described above can be implemented with this printing device according to the invention.

In specific variants of the invention, the printing device has two print heads arranged offset from one another in a print direction and a drive device to generate a relative movement between the print heads and the substrate to be printed in the print direction. For this the control device is designed to control the two print heads and the drive device such that two print images are generated on the substrate. To print the two print images, the control device generates first control signals for the first print head and second control signals for the second print head. Furthermore, to reduce an initial offset occurring between the two print images in a print direction upon generation of the second control signals, the control device uses stored correction information determined in advance, wherein an (in particular variable) delay of at least one of the second control signals is predetermined by the correction information. The variants and advantages described above can be realized to the same extent with this printing device, such that reference is made in this regard to the above statements. In particular, the method according to the invention that is described above can be implemented with this printing device according to the invention.

In preferred variants of the printing device according to the invention, it is provided that the control device is designed to determine the initial deviation (in particular the initial offset) from at least one test pattern generated by the at least one print head (in particular by both print heads) and/or at least one printing device behavior determined in advance for the printing device. It can thereby be provided that the printing device itself has a corresponding detection device to detect the test pattern (for example a reader) and/or the printing device behavior (for example a corresponding measurement device and/or a simulation device).

A suitable reader for reading is, for example, a CCD sensor device. Other sensors or similar elements can be just as suitable for a use in the device according to the invention. Furthermore, an already-present microprocessor, microcomputer or a similar device can be used for the determination of the initial offset, for example. In particular the phase position, the amplitude curve or the average value of the periodic offset portion and of the static offset portion can hereby be determined in a simple manner.

The delay of the control signal or (possibly second) control signals can in principle be generated in any suitable manner. The control device advantageously has at least one delay element to generate the (possibly variable) delay. The at least one delay element is advantageously a parameterizable delay element. For example, this can be a counter that is preset to a value (previously set by the control device) upon arrival of the encoder signal and is counted down with predetermined clock rate until zero is reached. Upon reaching zero, the time-delayed encoder pulse is generated at the output of the counter and is supplied to further processing in the printing device. Additionally or alternatively, it can also be provided that the at least one delay element is realized via a hardware filter, a microprocessor, a microcomputer, an FPGA and/or an ASIC.

Given use of a hardware filter, the control pulses can be directly delayed. Given the use of a microprocessor or microcomputer that respectively can already be implemented as an evaluation device or in general in a printing device, a plurality of possibilities are provided to realize a delay element. For example, a time loop can be implemented. A time counter can likewise be implemented. After its expiration, a print signal can be generated. Moreover, it is possible to use the time function of an operating system. If the printing device is used in connection with a franking machine, in particular the already-implemented FPGA can be used. It is understood that other realizations of a delay element can also be implemented according to other variants of the invention. The use of elements already implemented in a printing device can reduce effort and costs.

The method according to the invention and the printing device according to the invention can be used in arbitrary apparatuses. Arbitrary printing principles (inkjet, thermotransfer, etc.) can thereby be used. However, the use is particularly advantageous in connection with franking machines since particularly strict requirements with regard to print quality are placed on these. The present invention therefore furthermore concerns a franking machine with a printing device according to the invention. The variants and advantages described above can be realized to the same extent with this franking machine, such that reference is made in this regard to the above statements. In particular, the method according to the invention that is described above can be implemented with this franking machine according to the invention.

DESCRIPTION OF THE PREFERRED EMBODIMENTS

Figure 1:
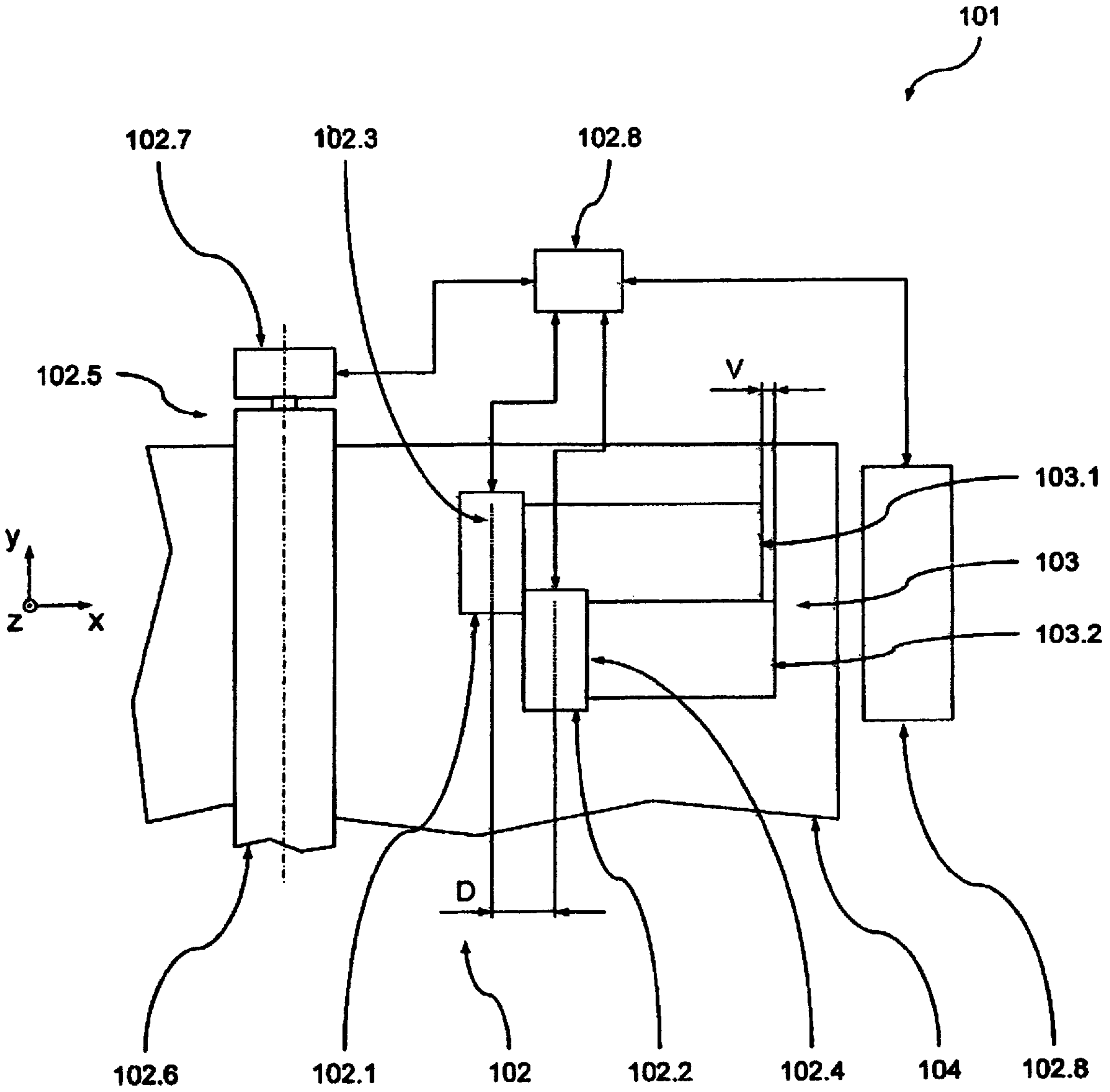
FIG. 1 is a schematic representation of a preferred exemplary embodiment of the franking machine according to the invention, with a preferred exemplary embodiment of the printing device according to the invention with which a preferred exemplary embodiment of the method according to the invention can be implemented.
Figure 2:
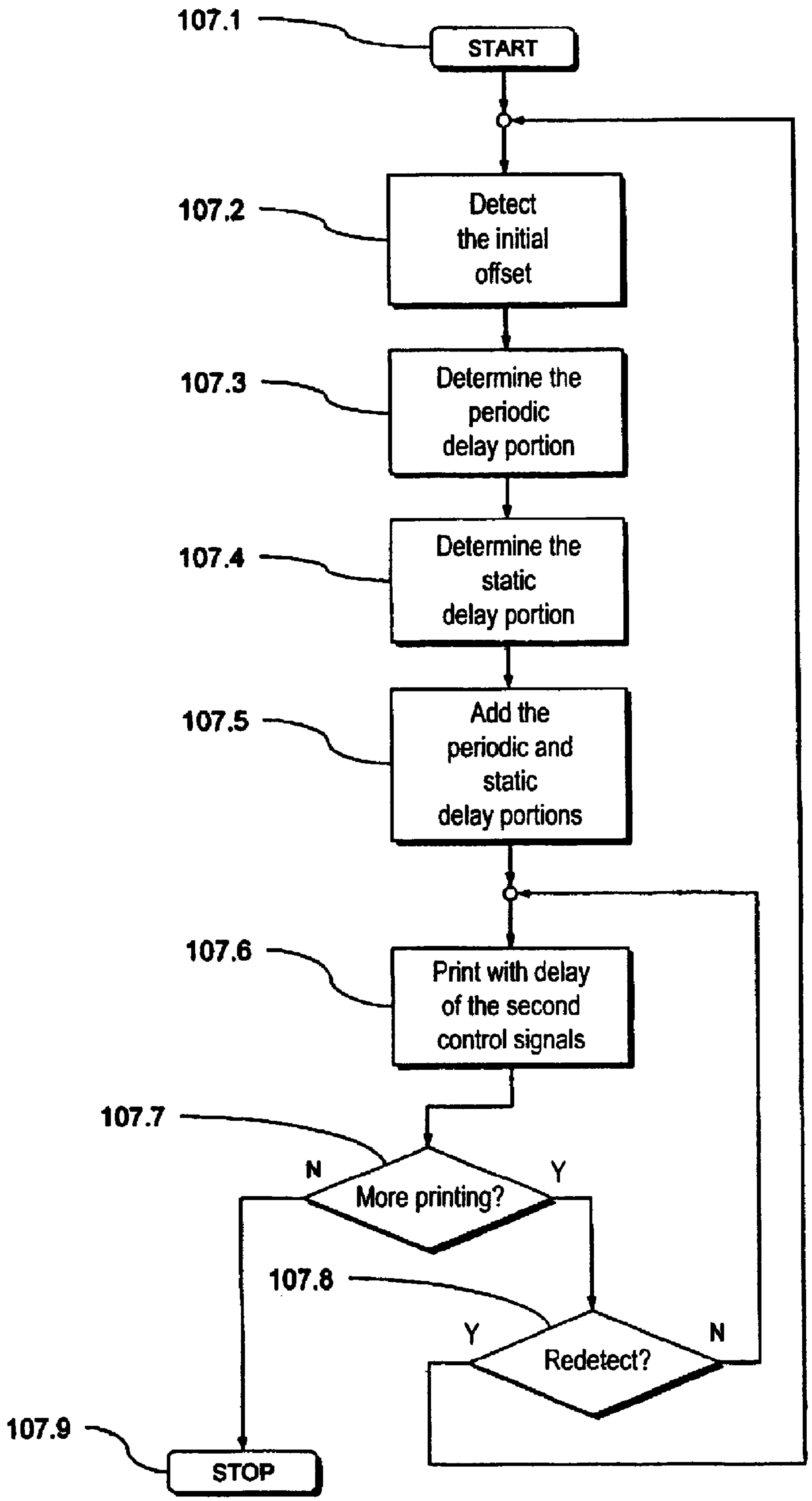
FIG. 2 is a flowchart of a preferred exemplary embodiment of the method according to the invention that is implemented with the franking machine from FIG. 1.

In the following, a preferred exemplary embodiment of the present franking machine, 101 according to the invention, with a preferred exemplary embodiment of the printing device 102 according to the invention, with which a preferred exemplary embodiment of the method according to the invention is implemented, is described with reference to FIGS. 1 through 7.

The printing device 102 has a first print head 102.1 and a second print head 102.2. In the present example, the two print heads 102.1 and 102.2 are inkjet print heads with a respective nozzle row 102.3 or, respectively, 102.4. However, it is understood that, in other variants of the invention, print heads can also be used that operate according to a different printing principle.

The two print heads 102.1 and 102.2 are arranged offset from one another both in a print direction (x direction) and in a direction (y direction) transversal to this print direction, such that two print images 103.1 and 103.2 that gaplessly adjoin one another transversal to the print direction can be printed with their nozzle rows 102.3 and 102.4 on a substrate 104 (for example a letter), which print images 103.1 and 103.2 yield an entire print image 103.

To print the entire print image 103, the letter 104 is transported past the two print heads 102.1, 102.2 in the print direction x via a transport device 102.5 with a transport roller 102.6. However, it is understood that, in other variants of the invention, it can also be provided that the two print heads are transported past a stationary substrate, or that both print heads and the substrate are moved.

The relative movement between the letter 104 and the two print heads 102.1, 102.2 is detected using a measurement device in the form of a shaft encoder 102.7 (designed as an encoder), connected with the transport roller 102.6. The encoder 102.7 supplies at its signal output a predetermined number of measurement signals per rotation of the transport roller 102.6 in the form of encoder pulses 105 (see FIG. 3) that are relayed to a control device 102.8 connected with an encoder 102.7.

The control device 102.8 is in turn connected with both print heads 102.1, 102.2 and controls these using the encoder pulses 105 in order to generate the two print images 103.1 and 103.2. The first print head 102.1 is thereby controlled with first control signals while the first print head 102.2 is controlled with second control signals 106 (see FIG. 3). However, on the one hand the problem hereby exists that first and second print image 103.1, 103.2 are respectively, inherently distorted along the print direction x (consequently, the pitch of successive pixels of the respective print image 103.1, 103.2 in the print direction x deviates from a predetermined desired pitch).

Figure 3:
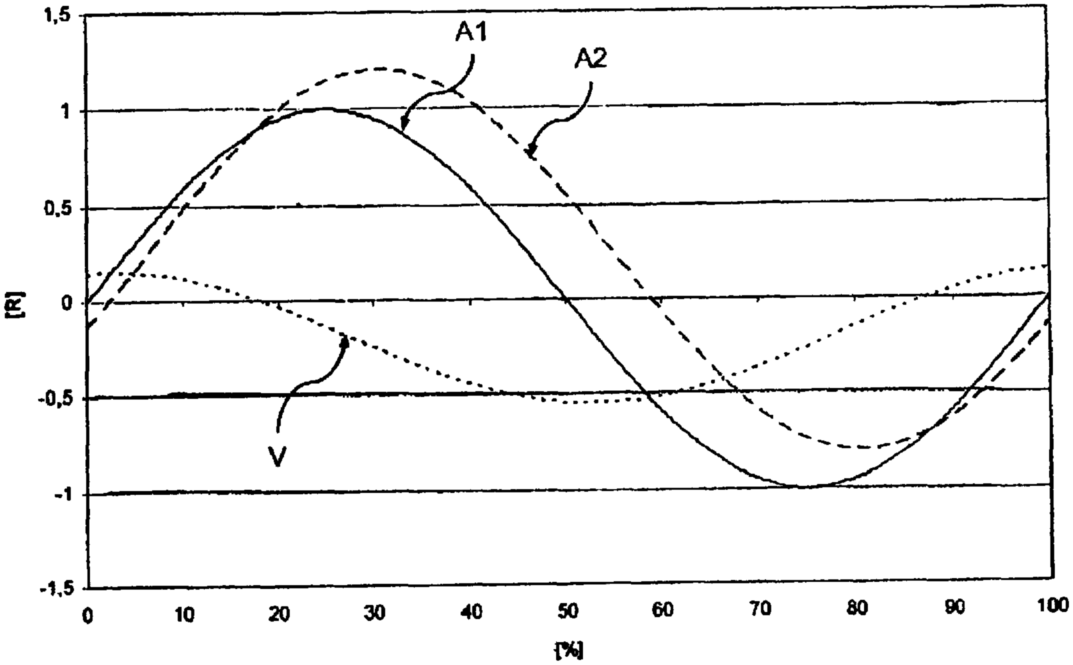
FIG. 3 is a schematic representation of deviations of the position of pixels generated by the franking machine from FIG. 1 from their desired position.

FIG. 3 shows by way of example the respective deviation A1(*x*) (first print image 103.1) or, respectively, A2(*x*) (second print image 103.2) of the pixels from the respective desired position in the whole print image 103 (relative to the print resolution R), depending on the position x (relative to the total length) in the whole print image 103.

Moreover, the further problem exists that, due to the offset of the print heads 102.1, 102.2 in the print direction x, pixels of the first and second print image 103.1, 103.2 that lie immediately adjacent are printed at different points in time.

For example, if a first pixel is printed at the edge of the first partial image 103.1 by the first print head 102.1 at a first point in time, the second pixel situated directly next to the first pixel at the edge of the second partial image 103.2 is only printed by the second print head 102.2 when the letter 104 (driven by the transport device 102.5) has overcome the distance D between the two nozzle rows 102.3 and 102.4 in the print direction x.

For this the control device 102.8 monitors (using the encoder pulses 105) the relative position between the print heads 102.1, 102.2 and the letter 104, and therefore the reaching of the position or, respectively, the point in time at which the second pixel is to be printed. Due to the time offset $\Delta t_p$ of the printing of adjacent points by different print heads 102.1, 102.2, the two print images 103.1 and 103.2 can exhibit an offset V in the print direction x. This offset V is likewise shown in FIG. 3. This is calculated as:

$$V(x)=A1(x)-A2(x) \quad (1)$$

Figure 4:
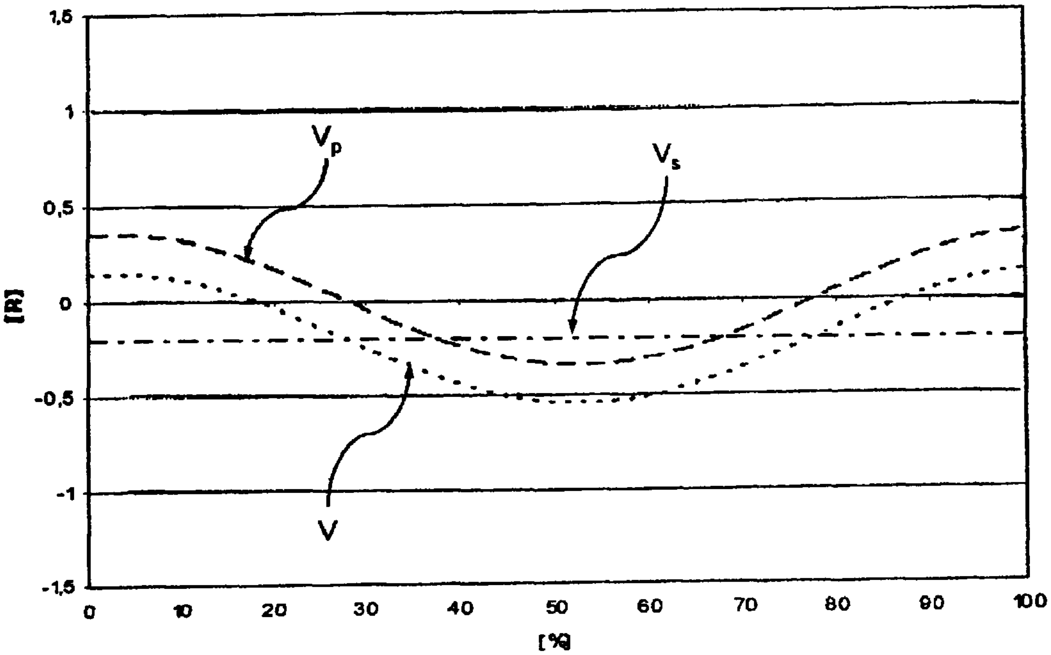
FIG. 4 is a schematic representation of the deviation of the pitch of pixels of the first and second print image from their desired position, which pixels are generated by the franking machine from FIG. 1.

The offset V typically has a static offset portion $V_s$ and a periodic offset potion $V_p$ that are shown in FIG. 4. The periodic offset portion $V_p$ can thereby naturally be composed of a plurality of periodic portions with different phase length. However, in the present example only a single periodic offset portion should be dealt with for simplification.

In the field of generation of franking images, such an offset V between the two adjoining (partial) print images 103.1 and 103.2 is unwanted—not least due to the increasing requirements for machine readability of the print images 103—and can be at least distinctly reduced in an advantageous manner with the present invention, as is explained in the following.

The static offset portion $V_s$ is typically due to diameter errors of the drive elements of the transport device 102.5 (for example the transport roller 102.6) or is based on position errors due to tolerances in the installation of the print heads 102.1, 102.2. For example, a deviation of the diameter of the transport roller 102.6 from its desired value, due to the fact that reaching the printing position or, respectively, the printing point in time $T_p$ too early (smaller diameter) or too late (larger diameter), is detected in the evaluation of the encoder pulses 105 of the encoder 102.7.

Moreover, the occurring periodic offset portion $V_p$ is due to variable interferences in the printing with the print heads 102.1, 102.2. Since adjacent points are printed by the two print heads 102.1, 102.2 at different points in time, a disruption present upon printing the first point with the first print head 102.1 has, under the circumstances, already subsided again when the immediately adjacent second pixel is printed with the second print head 102.2.

There are many causes for this periodic offset portion $V_p$, such as an eccentric connection of the encoder 102.7, an eccentricity of the transport roller (same period duration but deviating phase position), ovality errors of the transport rollers (deviating period duration and deviating phase position) as well as shocks that can occur due to changes of the engagement ratios of the drive elements of the transport device 102.5.

According to the invention, this problem is achieved in that a determination of an initial offset V between the two print images first occurs in Step 107.2 after the start of the method workflow that occurs in Step 107.1. For this, a first test whole print image 104 is initially generated which is then detected by a detection device 102.9 (for example a CCD chip or the like) connected with the control device 102.8. However, it is understood that the initial offset V can also be detected in a different manner in other variants of the invention. In particular, it can be provided that the user of the franking machine conducts a visual monitoring of the test whole print image, correspondingly classifies this and conducts a corresponding input into the franking machine via a suitable interface (for example a keyboard etc.).

It is hereby understood that the initial offset V is a function V(x) of the x coordinate of the whole print image 103 due to the periodic offset portion $V_p$. The initial offset V is thus consequently not a constant value along the print direction x over the length of the whole print image 103 (as can also be seen from FIGS. 3 and 4).

However, it is understood that, in other variants of the invention, it can also be additionally or alternatively provided that the initial offset V(x) is determined from at least one printing device behavior determined in advance for the printing device 102. The printing device behavior can be a behavior or, respectively, properties determined using measurements at the printing device 102 and/or using corresponding simulation calculations, which behavior or, respectively, properties have an influence on the initial offset V(x). This behavior does not necessarily have to have been determined at the printing device 102 itself. Rather, it is also possible to determine this behavior using measurements and/or simulations of a test printing device.

In Step 107.2, the initial offset V(x) is broken down via suitable, well-known methods into the static offset portion $V_s$ and one or more periodic offset portions $V_{pi}$. Thus:

$$V(x) = V_s(x) + V_p(x) = V_s(x) + \sum_i V_{pi}(x) \quad (2)$$

From this analysis of the detected initial offset V(x), correction information in the form of a delay function F(n) is subsequently determined by the control device 102.8, as is explained in further detail in the following. The delay function F(n) is also a linear combination of static and periodic portions. Thus:

$$F(n) = F_s(n) + F_p(n) = F_s(n) + \sum_i F_{pi}(n) \quad (3)$$

Using the delay function F(n), the control device 102.8 impresses a variable time delay $t_V(n)$ on the second control signals 106 for the second print head relative to the encoder pulses 105 delivered by the encoder 102.7, depending on the consecutive number n of the respective encoder pulse 105 (starting from a start point, for example the first generation of a pixel of the first print image 103.1). The time delay $t_V(n)$ is again a linear combination of static portions $t_V(n)$ and periodic portions $t_{Vpi}(n)$. Thus:

$$T_V(n) = T_{Vs}(n) + T_{Vp}(n) = T_{Vs}(n) + \sum_i t_{Vpi}(n) \quad (4)$$

For this, in a step 107.3 a periodic first delay portion $F_{pi}(n)$ is initially determined corresponding to the respective periodic first offset portion $V_{pi}$. For this, the respective periodic first offset portion $V_{pi}$ is initially associated with the individual encoder pulses 105, and from this the corresponding periodic first delay portion $F_{pi}(n)$ is determined such that the time delay $t_{vpi}(n)$ of the second control signals counteracts the offset V(x) of the two print images 103.1 and 103.2.

Figure 5:
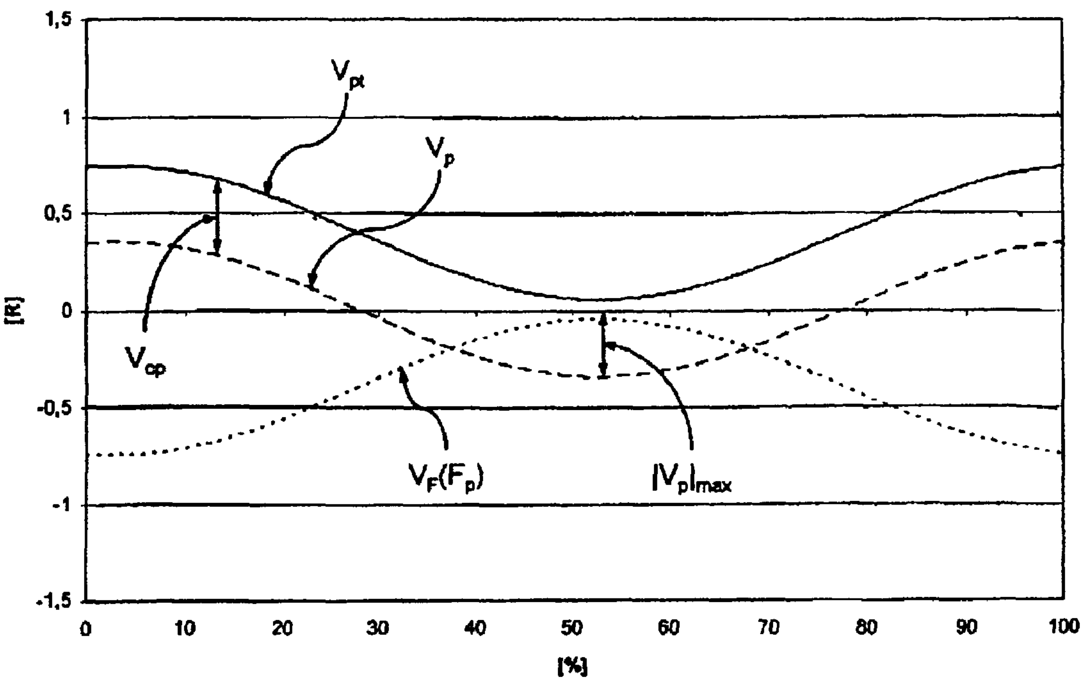
FIG. 5 is a schematic representation of the periodic delay portion for compensation of the periodic deviation portion in the franking machine from FIG. 1.

It is hereby understood that, for the case that a negative delay results by calculation from the periodic first offset portion $V_p$ (as shown in FIG. 5), it can be provided that all second control signals 106 are additionally delayed by a corresponding (constant) delay amount $V_{cp}$ (corresponding to at least the maximum absolute value $|V_p|_{max}$ of the determined negative delay) in order to always be able to work with positive delay values, since naturally the encoder pulses 105 can only be subjected to a positive delay. The periodic offset portion $V_p(n)$ is thus consequently adapted to an actual periodic offset portion $V_{pt}(n)$ (see FIG. 5), wherein $$V_{pt}(n)=V_p(n)+V_{cp}. \quad (5)$$

Using the actual offset portion $V_{pt}$, the periodic first delay portion $F_{pi}(n)$ can then be determined for which an offset $V_{Fp}(F_{pi})$ results, for which:

$$V_{pt}(n)+V_{Fp}(n)=0. \quad (6)$$

Furthermore, it is understood that for this purpose at least one second control signal 106 is naturally omitted as necessary (i.e. printing already occurs after N−1 and not only after N second control signals 106) in order to achieve the desired negative offset $V_{Fp}(F_{pi})$ for compensation (see FIG. 5) and therefore the desired printing point in time $T_p$.

A static second delay portion $F_s(n)$ corresponding to the static second offset portion $V_s$ is then determined in Step 107.3.

Figure 6:
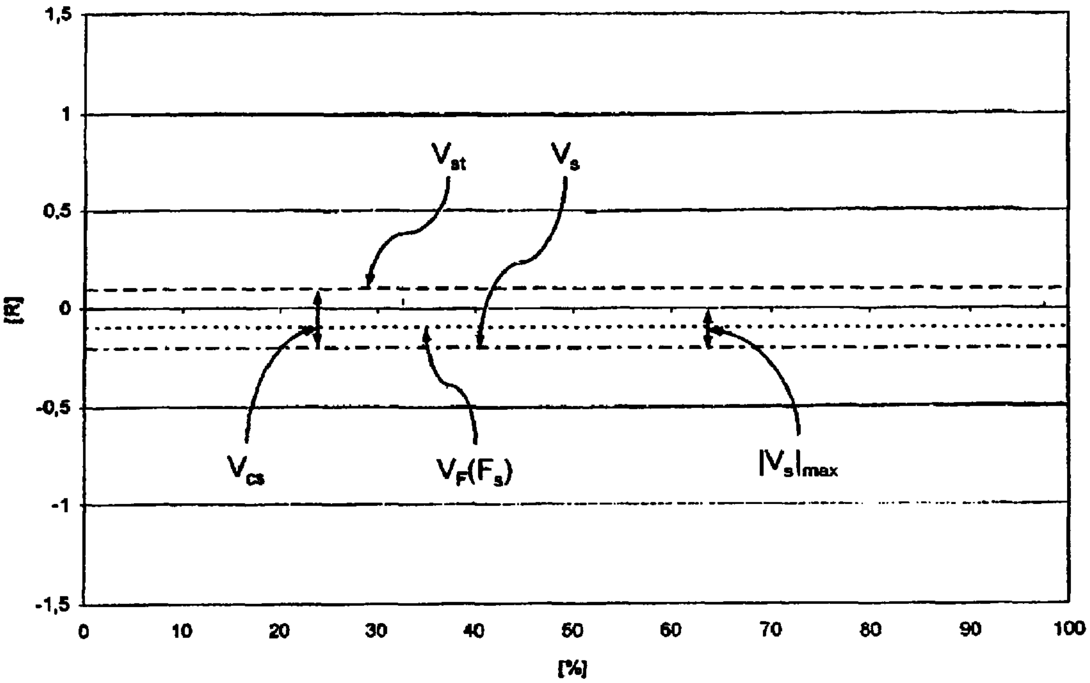
FIG. 6 is a schematic representation of the static delay portion for compensation of the static deviation portion in the franking machine from FIG. 1.

This can proceed in an manner analogous to as with the periodic offset portion, as this is shown in FIG. 6. A static second delay portion $F_s(n)$ corresponding to the static second offset portion $V_s$ can thus be determined. For this purpose, the static second offset portion $V_s$ is initially associated with the individual encoder pulses 105, and from this the corresponding static second delay portion $F_s(n)$ is determined such that the time delay $t_{Vs}(n)$ of the second control signals counteracts the static offset V(x) of the two print images 103.1 and 103.2.

It is understood that, in the event that a negative delay results via calculation from the static second offset portion $V_s$ (as shown in FIG. 6), it can be provided that all second control signals 106 are additionally delayed by a corresponding (constant) delay amount $V_{cs}$ (corresponding to at least the maximum absolute value $|V_s|_{max}$ of the determined negative delay) in order to always be able to work with positive delay values, since naturally the encoder pulses 105 can only be subjected to a positive delay. The static offset portion $V_s(n)$ is thus consequently increased to a real static offset portion $V_{st}(n)$ (see FIG. 6), wherein:

$$V_{st}(n)=V_s(n)+V_{cs}. \quad (7)$$

Using the real offset portion $V_{st}$, the static first delay portion $F_{st}(n)$ can then be determined for which an offset $V_{Fs}(F_s)$ results, for which:

$$V_{st}(n)+V_{Fs}(n)=0 \quad (8)$$

Furthermore, it is hereby understood that for this at least one second control signal 106 is naturally omitted as necessary (i.e. printing already occurs after N−1 and not only after N second control signals 106) in order to achieve the desired negative offset $V_{Fs}(F_s)$ for compensation (see FIG. 6) and therefore the desired printing point in time $T_p$.

In other variants of the invention it can be provided that, in Step 107.3, the static second offset portion $V_s$ is initially associated with the individual encoder pulses 105, and from this the corresponding second delay portion $F_s(n)$ is determined such that the time delay $t_{Vs}(n)$ of the second control signals counteracts the offset V(x) of the two print images 103.1. and 103.2.

Figure 7:
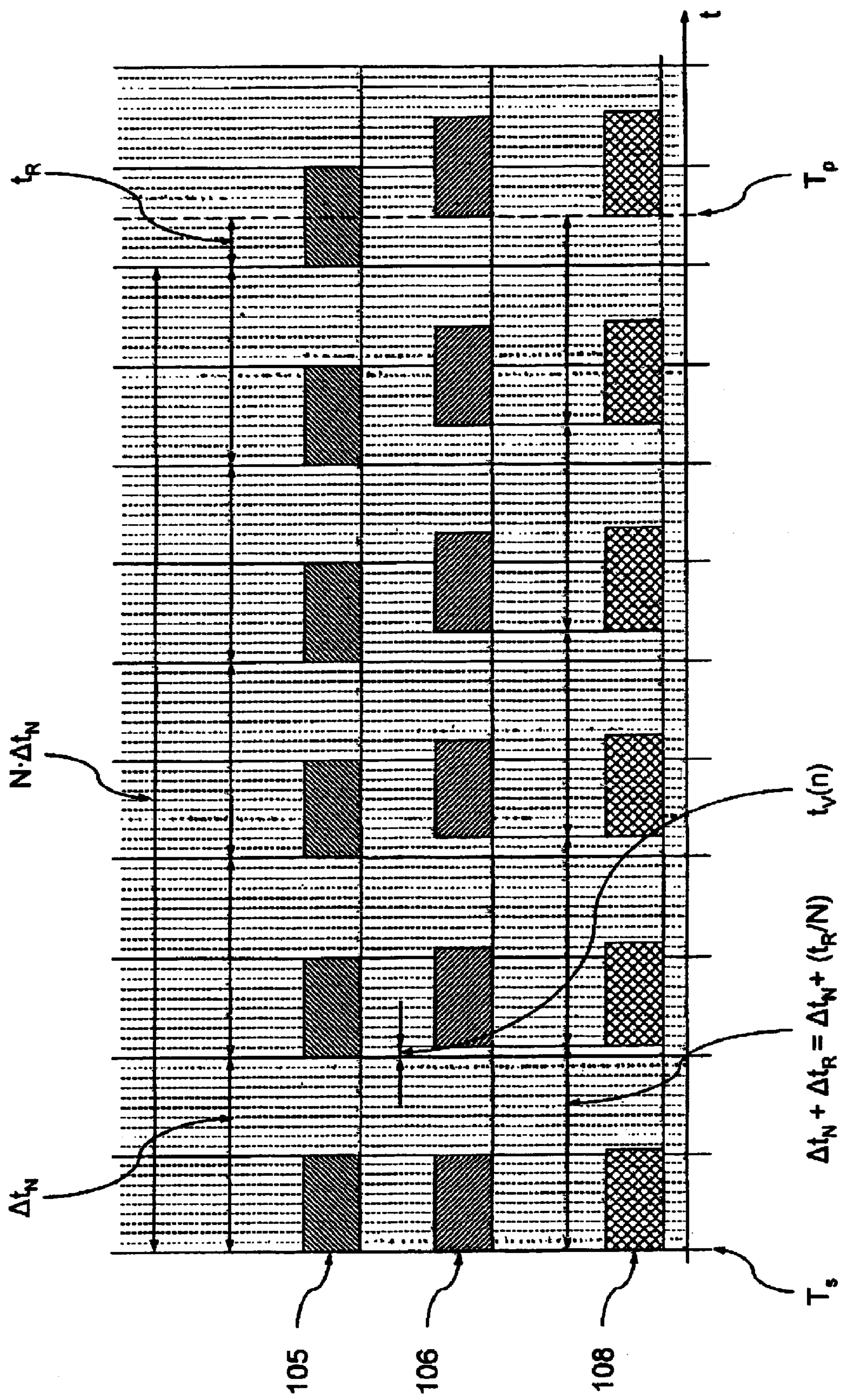
FIG. 7 is a schematic representation of the temporal progression of individual signals during the implementation of the method from FIG. 2.

A print time offset $t_R$ corresponding to the static second offset portion $V_s(x)$ is thereby determined as a difference of a desired point in time $T_p$ to avoid the static second offset portion $V_s(x)$ and a predeterminable number N of periods of the encoder pulses 105 (period duration $\Delta t_N$). The desired point in time $T_p$ thereby results from a predetermined number N of desired encoder pulses 108 as they are shown in FIG. 7. The number N in the present example is selected so that an optimally small, positive print time offset results.

It is hereby to be noted that, for simplification of the presentation, FIG. 7 shows only very few encoder pulses between the start point in time $T_s$ (for example print point in time of the first pixel by the first print head 102.1) and the desired point in time $T_p$ (print point in time of the second pixel immediately adjacent to the first pixel by the second print head 102.2). It is understood that, in reality, a significantly higher number of encoder pulses (typically more than 50) can lie between the start point in time $T_s$ and the desired point in time $T_p$.

For the case that the print time offset $t_R$ is not an integer multiple of the period duration $\Delta t_N$ of the encoder pulses 105, the print time offset $t_R$ is sub-divided into N identical delay values $\Delta t_R$, for which:

$$\Delta t_R = \frac{t_R}{N}. \quad (9)$$

The static second delay portion $F_s(n)$ is then selected so that, upon printing, the encoder pulses 105 for generation of the second control signals 106 are moreover respectively delayed by the delay value $\Delta t_R$ relative to the preceding encoder pulse 105, such that a continuous, linearly increasing delay $t_{Vs}(n)$ of the second control signals 106 with regard to the start point in time $T_s$ results relative to the encoder pulses 105.

It is understood that, in other variants of the invention, in principle an arbitrary distribution of the total print time offset $t_R$ to be achieved to the individual second control signals 106 is possible. In other words, it can possibly also be provided that only one or individual second control signals 106 are corresponding delayed.

In Step 107.5, the delay function F(n) which represents the time delay of the second control signals 106 is then determined by the control device 102.8 according to Equation (2). The delay function F(n) can in principle be defined in an arbitrary manner. Corresponding tables or data sets with corresponding discrete values for the time delay $t_V(n)$ are advantageously stored in a memory of the control device 102.8, since a particularly simple realization with low processing effort is possible with this. Intermediate values can then be determined in the control device 102.8 as necessary via interpolation or the like. However, it is also possible that the delay function F(n) is provided by a continuous function.

A predetermined whole print image 103 is then generated in Step 107.6, wherein the control device 102.8 uses the delay function F(n) in order to correspondingly delay the second control signals 106 and thus to reduce the offset V between the two print images 103.1 and 103.2. In other words, with the present invention it is possible to compensate for a known or, respectively, foreseeable interference (for example a periodic disruption inherent to the operation of the printing device) that would, in conventional printing devices, lead to a periodic offset between the two print images, in that the second control signals 106 are correspondingly delayed so that the corresponding pixel of the second print image 104.2 that is printed via the second print head 102.2 again lies at the exact desired position next to the first pixel of the first print image 103.1 that is printed previously by the first print head 102.1.

The time delay of the second control signals 106 can in principle be generated by the control device 102.8 in any suitable manner. The control device advantageously comprises at least one parameterizable delay element to generate the corresponding time delay. For example, this can be a counter that is preset to a value (set in advance by the control device) upon arrival of the encoder signal 105 and counts down with predetermined clock rate until the value reaches zero. Upon reaching zero, the time-delayed encoder pulse 105 is generated as a second control signal 106 at the output of the counter and is supplied for further processing in the printing device 102. However, it is understood that, in other variants of the invention, it can also be additionally or alternatively provided that the at least one delay element is realized via a hardware filter, a microprocessor, a microcomputer, an FPGA and/or an ASIC.

Given use of a hardware filter, the control pulses can be directly delayed. Given the use of a microprocessor or microcomputer, a plurality of possibilities are provided to realize a delay element. For example, a time loop can be implemented. A time counter can likewise be implemented. After its expiration, a print signal can be generated. Moreover, it is possible to use the time function of an operating system. In particular, the already-implemented FPGA in the franking machine 101 can be used.

In Step 107.7 it is then checked whether an additional print image 103 is to be printed. If this is not the case, the method workflow ends in Step 107.9. Otherwise, in Step 107.8 it is checked whether a detection of the initial offset error V and a determination of the delay function F(n) should be implemented again. If this is the case, the workflow jumps back to Step 107.2. Otherwise, the workflow jumps back to Step 107.6.

It is hereby to be noted that the redetection of the initial offset error V and redetermination of the delay function F(n) can occur after each printing of a print image 103, wherein the print image 103 just generated can then serve as a basis for the detection of the initial offset error V and the determination of the delay function F(n). However, this can also be provided upon occurrence of an arbitrary temporal event (for example after the expiration of a specific time etc.) or non-temporal event (for example after the generation of k print images etc.).

The present invention was described in the preceding using examples in which the second print image 103.2 was ultimately synchronized with the first print image 103.1, such that no offset V(x) results between the immediately adjacent (transversal to the printing direction x) points of the two print images 103.1 and 103.2 in the printing direction x. However, a distortion (local expansion and/or contraction) of the whole print image 103, which is to be ascribed to the same causes as the offset between the two print images 103.1 and 103.2, is still not compensated by this. Rather, ultimately the distortion of the second print image 103.2 only follows the distortion of the first print image (as it manifests in the deviation A1($x$) shown in FIG. 3).

In preferred variants of the invention it is therefore provided that a corresponding delay is also applied to the first control signals for the first print head in order to bring the deviation A1($x$) (previously correspondingly determined or, respectively, detected) shown in FIG. 3; thus the deviation of points of the first print image 103.1 from their desired pitch in the print direction x) to a value of at least nearly zero. This can hereby proceed analogous to as with the delay of the second control signals described above. Ultimately, the deviation A1($x$) is hereby determined like the offset V(x) described above and is subsequently compensated in an analogous manner (employing the procedure described using Equations 2 through 8).

Figure 8:
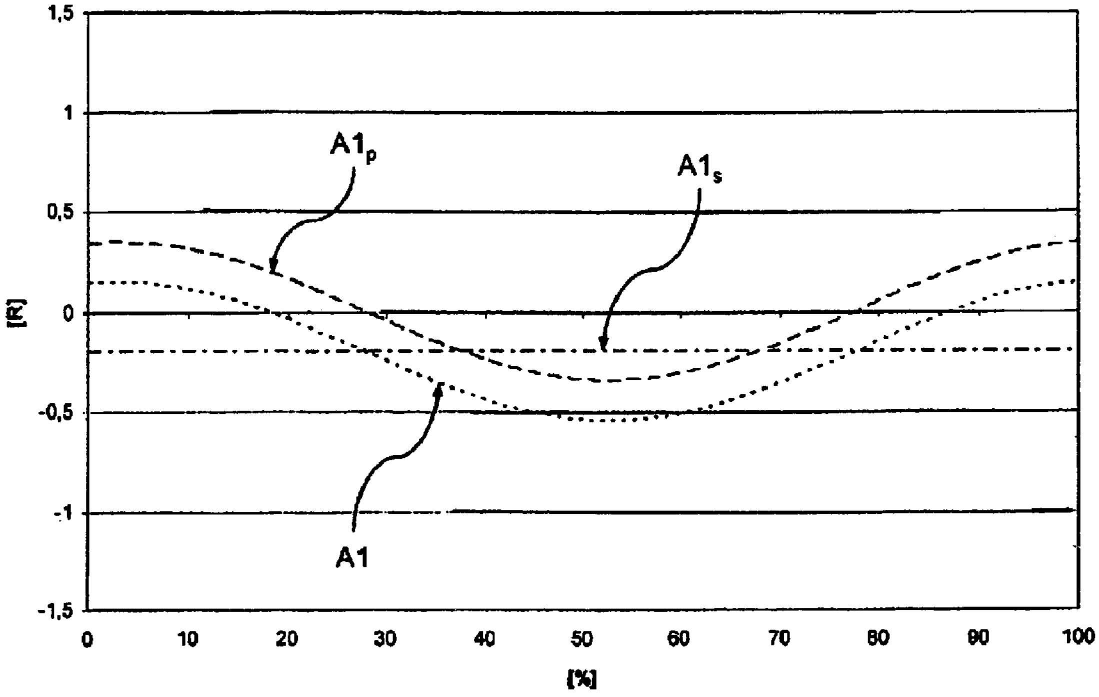
FIG. 8 is a schematic representation of the deviation of the pitch of pixels of the first print image from their desired pitch, which pixels are generated by the franking machine.

The initial deviation A1($x$) is thereby broken down via suitable, well-known methods into the static deviation portion $\mathbf{A1}_s$ and one or more periodic deviation portions $\mathbf{A1}_{pi}$, as this is shown in FIG. 8 (as an example of a deviation A1 that is different from the deviation A1 of FIG. 3). Thus:

$$A1(x) = A1_s(x) + A1_p(x) = A1_s(x) + \sum_i A1_{pi}(x). \quad (9)$$

From this analysis of the detected initial deviation A1($x$), correction information in the form of a delay function FA1($n$) is subsequently determined by the control device 102.8, as is explained in further detail in the following. The delay function FA1($n$) is also a linear combination of static and periodic portions. Thus:

$$FA1(n) = FA1_s(n) + FA1_p(n) = FA1_s(n) + \sum_i FA1_{pi}(n) \tag{10}$$

Using the delay function FA1($n$), the control device 102.8 impresses a variable time delay $t_{VA1}$(n) on the further control signals for the first print head 102.1 relative to the encoder pulses 105 delivered by the encoder 102.7, depending on the consecutive number n of the respective encoder pulse 105 (starting from a start point, for example the first generation of a pixel of the first print image 103.1). The time delay $t_{VA1}$(n) is again a linear combination of static portions $t_{VA1}$(n) and periodic portions $t_{VA1pi}$(n). Thus:

$$t_{VA1}(n) = t_{VA1s}(n) + t_{VA1p}(n) = t_{VA1s}(n) + \sum_i t_{VA1pi}(n). \tag{11}$$

For this purpose, a periodic first delay portion FA$\mathbf{1}_{pi}$(n) is initially determined corresponding to the respective periodic first deviation portion A$\mathbf{1}_{pi}$. For this, the respective periodic first deviation portion A$\mathbf{1}_{pi}$ is initially associated with the individual encoder pulses 105, and from this the corresponding periodic first delay portion FA$\mathbf{1}_{pi}$(n) is determined such that the time delay $t_{VA1pi}$(n) of the first control signals counteracts the deviation A1($x$).

Figure 9:
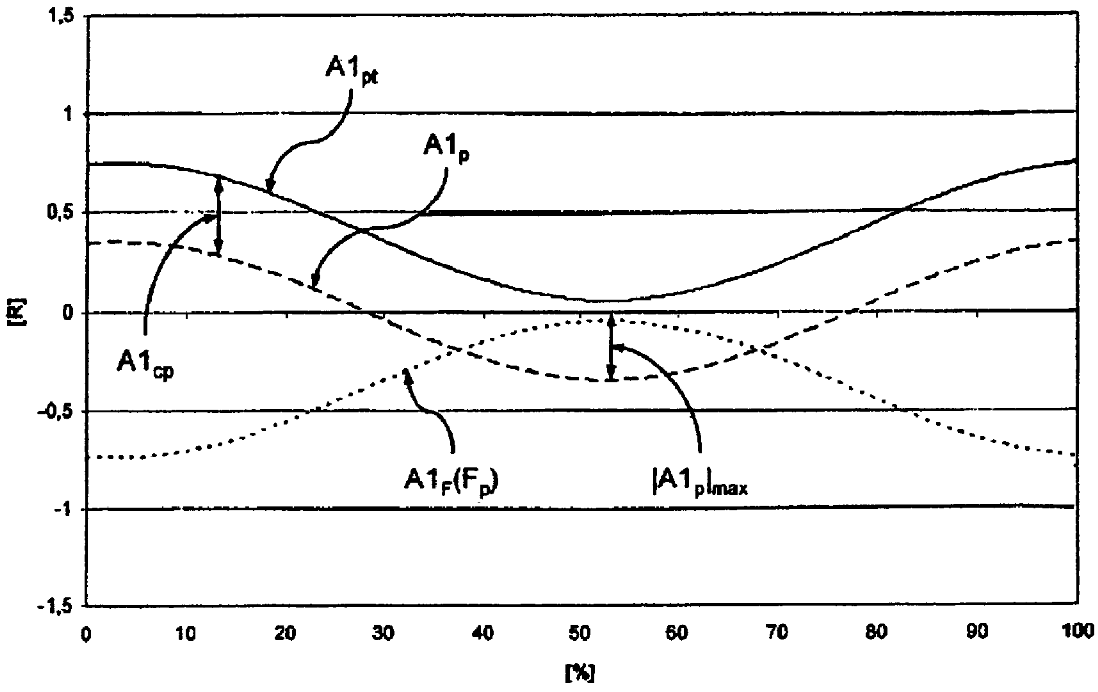
FIG. 9 is a schematic representation of the periodic delay portion for compensation of the periodic deviation portion in the franking machine from FIG. 2.

It is hereby understood that, for the case that a negative delay results by calculation from the periodic first offset portion $V_p$ (as shown in FIG. 9), it can be provided that all first control signals are additionally delayed by a corresponding (constant) delay amount VA$\mathbf{1}_{cp}$ (corresponding to at least the maximum absolute value |A$\mathbf{1}_p$|$_{max}$ of the determined negative delay) in order to always be able to work with positive delay values, since naturally the encoder pulses 105 can only be subjected to a positive delay. The periodic deviation portion A$\mathbf{1}_p$(n) is thus consequently increased to a real periodic offset portion A$\mathbf{1}_{pti}$(n) (see FIG. 9), wherein:

$$A1_{pt}(n)=A1_p(n)+A1_{cp}. \tag{12}$$

Using the actual deviation portion A$\mathbf{1}_{pti}$(n), the periodic first delay portion FA$\mathbf{1}_{pi}$(n) can then be determined for which a deviation portion A$\mathbf{1}_{Fp}$($F_{pi}$) results, for which:

$$A1_{pt}(n)+A1_{Fp}(n)=0. \tag{13}$$

Furthermore, it is understood that for this at least one first control signal is naturally omitted as necessary (i.e. printing already occurs after N−1 and not only after N first control signals) in order to achieve the desired negative deviation A$\mathbf{1}_{Fp}$($F_{pi}$) for compensation (see FIG. 9) and therefore the desired printing point in time $T_p$.

A static second deviation portion A$\mathbf{1}_s$ corresponding to the static second delay portion FA$\mathbf{1}_s$(n) is subsequently determined.

Figure 10:
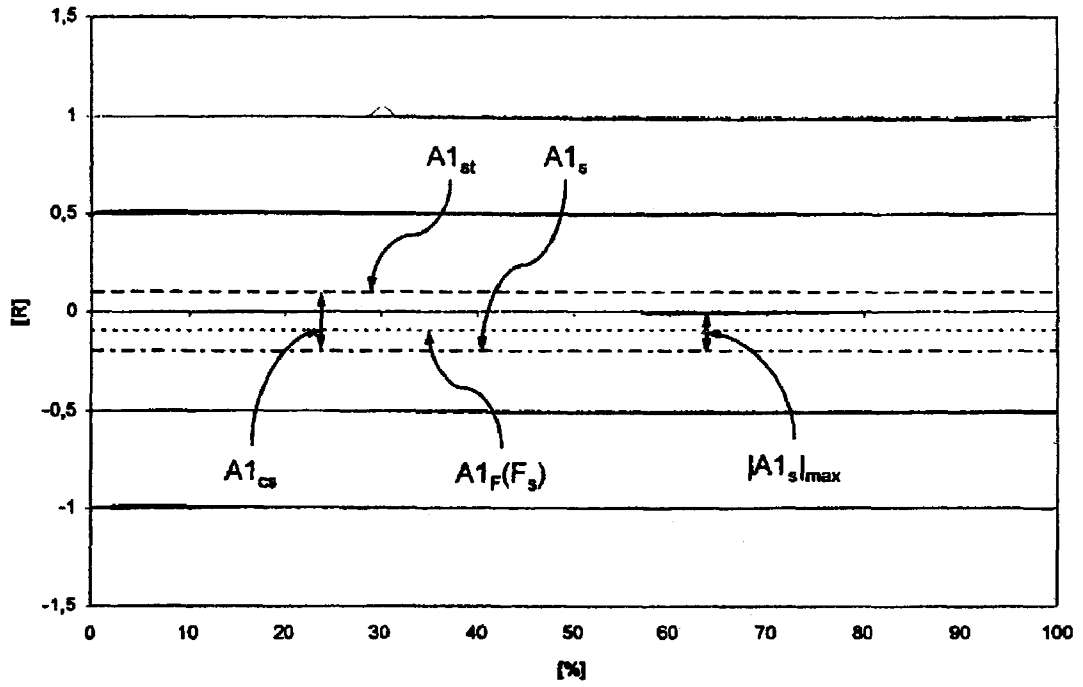
FIG. 10 is a schematic representation of the static delay portion for compensation of the static deviation portion in the franking machine from FIG. 2.

This can proceed in an manner analogous to as with the periodic deviation portion, as this is shown in FIG. 10. A static second deviation portion FA$\mathbf{1}_s$(n) corresponding to the static second deviation portion A$\mathbf{1}_s$ can thus be determined. For this, the static second deviation portion A$\mathbf{1}_s$ is initially associated with the individual encoder pulses 105, and from this the corresponding static second delay portion FA$\mathbf{1}_s$(n) is determined such that the time delay $t_{VA1s}$(n) of the first control signals counteracts the static deviation A1($x$).

It is understood that, in the event that a negative delay results via calculation from the static second deviation portion A$\mathbf{1}_s$ (as shown in FIG. 10), it can be provided that all first control signals are additionally delayed by a corresponding (constant) delay amount A$\mathbf{1}_{cs}$ (corresponding to at least the maximum absolute value $\sqrt[3]{}$A$\mathbf{1}_s$|$_{max}$ of the determined negative delay) in order to always be able to work with positive delay values, since naturally the encoder pulses 105 can only be subjected to a positive delay. The static offset portion A$\mathbf{1}_s$(n) is thus consequently increased to a real static offset portion A$\mathbf{1}_{st}$(n) (see FIG. 10), wherein:

$$A1_{st}(n)=A1_s(n)+A1_{cs}. \tag{14}$$

Using the actual deviation portion A$\mathbf{1}_{st}$, the static first delay portion FA$\mathbf{1}_{si}$(n) can then be determined for which a deviation A$\mathbf{1}_{Fs}$($F_s$) results, for which:

$$A1_{st}(n)+A1_{Fs}(n)=0. \tag{15}$$

Furthermore, it is understood that for this at least one first control signal is naturally omitted as necessary (i.e. printing already occurs after N−1 and not only after N second control signals 106) in order to achieve the desired negative deviation A$\mathbf{1}_{Fs}$($F_s$) for compensation (see FIG. 10) and therefore the desired printing point in time $T_p$.

In this case, the delay of the first control signals (which compensates a distortion of the first print image 103.1 in the print direction x) then yields in FIG. 3 a straight line A1($x$)=0 which then can be used in Steps 107.3 through 107.6 as a basis for compensation of the offset V(x) between the two print images 103.1 and 103.2 in order to ultimately obtain a whole print image 103 undistorted in the print direction x, without offset between the two (partial) print images 103.1 and 103.2.

It is hereby understood that the distortion compensation in the print direction x that was just described can be used not only in the printing devices with multiple print heads that are described above. Rather, it can naturally also be advantageously used in any printing devices with only one print head.

The present invention was described in the preceding using examples with franking machines, but it is understood that it can also be used in connection with any other devices with a corresponding printing device.

Although modifications and changes may be suggested by those skilled in the art, it is the intention of the inventor to embody within the patent warranted hereon all changes and modifications as reasonably and properly come within the scope of his contribution to the art.

We claim as our invention:

1. A method to reduce a deviation from a predetermined desired pitch that occurs between at least two points of at least one print image in a print direction, comprising the steps of:

in a printing step, generating at least one print image, that comprises at least two points, on a substrate with at least one print head of a printing device with a relative movement between the at least one print head and the substrate;

in a determination step preceding the printing step, from an initial image selected from the group consisting of a theoretical image and a test printed image automatically determining an initial deviation in said initial image from a desired pitch between two points in the initial image corresponding to the two points in said print image and, from said initial deviation, automatically determining correction information to reduce the initial deviation from the determined initial deviation;

in the printing step, generating control signals for the at least one print head depending on the correction information to generate the at least one print image; and applying a time delay to at least one of the control signals dependent on the correction information that reduces an actual deviation from said desired deviation between said two points in said print image.

2. A method according to claim 1, comprising:

determining the initial deviation as comprising at least one of a periodic deviation portion and a static deviation portion;

determining the time delay for the at least one control signal from the correction information as having at least one of a periodic delay portion corresponding to said at least one periodic deviation portion and a static delay portion corresponding to said at least one static deviation portion; and selecting said at least one of the periodic delay portion and the static delay portion to cause the time delay of the at least one control signal to counteract the initial deviation of the two points from said desired pitch.

3. A method according to claim 2, comprising reducing an offset between two print images in a print direction, said offset forming the deviation from a predetermined desired pitch, in the printing step, generating the two print images on the substrate with two print heads offset from one another in the printing direction with a relative movement between the print heads and the substrate;

in the determination step preceding the printing step, automatically determining an initial offset between the two print images and determining correction information to reduce the offset from the determined initial offset;

in the printing step to generate the two print images, generating first control signals for the first print head and second control signals for the second print head depending on the correction information; and applying a variable time delay to at least one of the second control signals dependent on the correction information.

4. A method according to claim 3, comprising generating the first control signals and the second control signals from measurement signals that are representative of the relative movement between the two print heads and the substrate; and generating the measurement signals as pulses of an encoder that is connected with a drive that generates the relative movement between the two print heads and the substrate.

5. A method according to claim 3 wherein the initial offset has at least one periodic first offset portion, and comprising:

providing a variable time delay for the at least one second control signal dependent on the correction information that has a periodic first delay portion corresponding to the periodic first offset portion; and selecting the periodic first delay portion to cause the time delay of the at least one second control signal to counteract the offset of the two print images.

6. A method according to claim 5, comprising:

generating the first control signals and the second control signals from measurement signals that are representative of the relative movement between the two print heads and the substrate;

in the determination step, determining the periods and the phase position of the periodic first offset portion with regard to the measurement signals; and selecting the amplitude of the first delay portion as a function of the phase position of the first offset portion.

7. A method according to claim 3 determining the initial offset as comprising at least one static second offset portion due to the offset of the two print heads;

providing a variable time delay for the at least one second control signal that has a second delay portion dependent on the correction information; and forming the second delay portion as a linear delay portion.

8. A method according to claim 7, comprising:

generating the first control signals and the second control signals from measurement signals that are representative of the relative movement between the two print heads and the substrate;

in the determination step, determining a print time offset corresponding to the static, second offset portion as a difference of a desired point in time to avoid the static second offset portion and a predeterminable number N of periods of the measurement signals;

if the print time offset is not an integer multiple of the period duration of the measurement signals, dividing the print time offset into M equal delay values; and delaying at least one part of the measurement signal delayed one of the delay values with regard to the preceding measurement signal to form the second control signals.

9. A method according to claim 8, comprising selecting the predeterminable number N of periods of the measurement signals to produce a positive print time offset.

10. A method according to claim 8, comprising:

dividing the print time offset into N identical delay values;

delaying each subsequent measurement signal delayed by one of the delay values relative to the preceding measurement signal.

11. A method according to claim 8 comprising determining the initial deviation in the determination step from at least one test pattern generated by the at least one print head and/or at least one print device behavior determined in advance for the print device.

12. A method according to claim 1, comprising predetermining the correction information by a data set with discrete values for the time delay.

13. A printing device, comprising:

a control device, at least one print head, and a drive device that generates a relative movement between the at least one print head and a substrate to be printed in a print direction;

the control device being configured to control the at least one print head and the drive device to cause at least one print image, comprising at least two points, to be generated on the substrate;

said control device being configured to have access to an electronic representation of an initial deviation in an initial image, selected from the group consisting of a theoretical image and a test printed image, from a desired pitch between two points in the initial image corresponding to the two points in said print image;

the control device being configured to generate control signals for the at least one print head to print the at least one print image that reduce an actual deviation from said desired pitch that occurs between said at least two points of the at least one print image in the print direction, by using said correction information; and the control device being configured to apply a time delay to at least one of the control signals dependent on the correction information that reduces said actual deviation.

14. A printing device according to claim 13, wherein the deviation exhibits at least one of a periodic deviation portion and a static deviation portion, and wherein the control device is configured to:

predetermine said time delay of the at least one control signal from the correction information to comprise at least one of a periodic delay portion corresponding to the periodic deviation portion and a static delay portion corresponding to the static deviation portion; and to select said at least one of the periodic delay portion the static delay portion to cause the time delay of the control signals to counteract the actual deviation of the two points in said print image from said desired pitch.

15. A printing device according to claim 13 comprising two print heads offset from one another in the printing direction and a drive device that generates a relative movement in the print direction between the print heads and a substrate to be printed;

the control device being configured to control the two print heads and the drive device to cause two print images to be generated on the substrate;

to print the two print images, the control device is configured to generate first control signals for the first print head and second control signals for the second print head; and to reduce an initial offset occurring between the two print images in a print direction upon generation of the second control signals, the control device is configured to use stored correction information determined in advance and to predetermine a variable time delay of at least one of the second control signals from the correction information.

16. A printing device according to claim 15, comprising:

a measurement device that generates measurement signals representative of the relative movement between the two print heads and the substrate;

the control device being configured to generate the first control signals and the second control signals from the measurement signals; and said measurement device being an encoder that is connected with the drive device, and the measurement signals are encoder pulses of the encoder.

17. A printing device according to claim 15 wherein the initial offset has at least one periodic first offset portion and the control unit is configured to determine a variable time delay of the at least one second control signal from the correction information, which delay has a periodic first delay portion corresponding to the periodic first offset portion, and to select the periodic first delay portion to cause the time delay of the at least one second control signal to counteract the offset of the two print images.

18. A printing device according to claim 17, wherein the control device is configured to generate the first control signals and the second control signals from measurement signals of a measurement device that are representative of the relative movement between the two print heads and the substrate, and to provide the amplitude of the first delay portion as a function of the phase position of the first offset portion from previously determined, stored information about the period and the phase position of the periodic first offset portion with regard to the measurement signals.

19. A printing device according to claim 15 wherein the initial offset has at least one static second offset portion due to the offset of the two print heads, and wherein the control unit is configured to determine a variable time delay of the at least one second control signal that has a second delay portion provided by the correction information, the second delay portion being a linear delay portion.

20. A printing device according to claim 19, wherein the control device is configured:

to generate the first control signals and the second control signals from measurement signals that are representative of the relative movement between the two print heads and the substrate;

to use a print time offset corresponding to the static, second offset portion, which print time offset was determined in advance as a difference of a desired point in time to avoid the static second offset portion and a predeterminable number N of periods of the measurement signals;

if the print time offset is not an integer multiple of the period duration of the measurement signals, to divide the print time offset into M equal delay values; and to respectively delay at least one part of the measurement signals by one of the delay values with regard to the preceding measurement signal to form the second control signals.

21. A printing device according to claim 20, wherein the control device is configured to select the predeterminable number N of periods of the measurement signals to produce a positive print time offset.

22. A printing device according to claim 20, wherein the control device is configured to:

divide the print time offset into N identical delay values; and respectively delay each subsequent measurement signal by one of the delay values relative to the preceding measurement signal.

23. A printing device according to claim 13 wherein the control device is configured to determine the initial deviation from at least one test pattern generated by the at least one print head and/or at least one print device behavior determined in advance for the print device.

24. A printing device according to claim 13 wherein the correction information is predetermined by at least one data set with corresponding discrete values for the time delay.

25. A printing device according to any of the claim 13 wherein the control device comprises at least one delay element to generate the variable time delay.

26. A printing device according to claim 25, wherein the at least one delay element is a parameterizable delay element.

27. A printing device according to claim 25 wherein the delay element is formed by at least one component selected from the group consisting of hardware filters, a microprocessors, a microcomputers, FPGAs and ASICs.

28. A printing device according to claim 13 comprising:

a reader that reads at least one test pattern generated by the at least one print head; and a determination device that determines at least one printing device behavior characteristic of the printing device.

* * * * *